Figure 1:
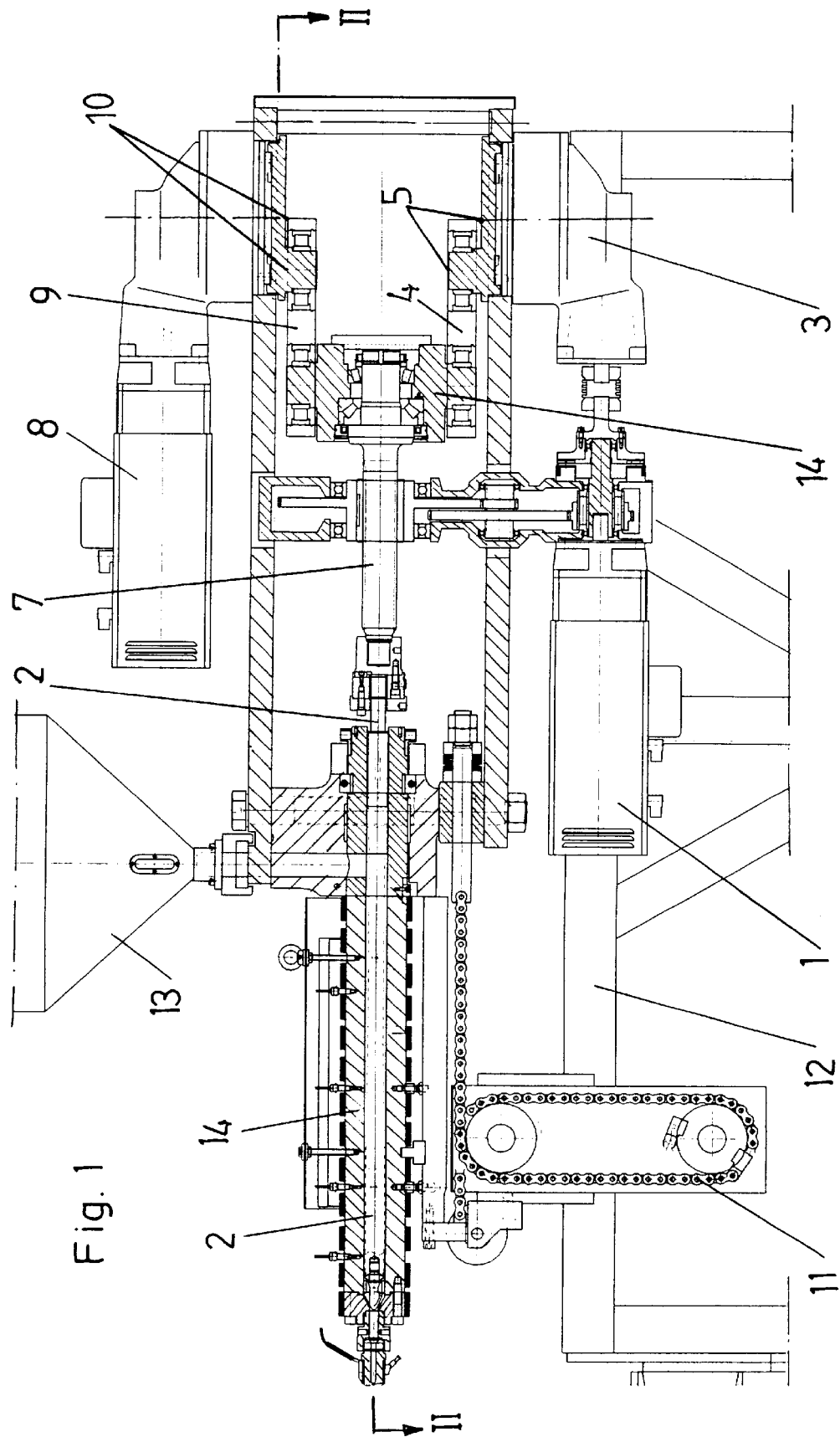

United States Patent [19]
Eppich et al.

[11] Patent Number: 6,015,284
[45] Date of Patent: Jan. 18, 2000

[54] INJECTION UNIT FOR INJECTION MOLDING MACHINES

[75] Inventors: Stefan Eppich, Arbing; Werner Kappelmuller, Schwertberg, both of Austria

[73] Assignee: Engel Maschinenbau Gesellschaft M.B.H., Schwertberg, Austria

[21] Appl. No.: 09/054,992

[22] Filed: Apr. 3, 1998

[30] Foreign Application Priority Data

Apr. 9, 1997 [AT] Austria .................................. 211/97 U

[51] Int. Cl.[7] .................................................. B29C 45/50
[52] U.S. Cl. .............................. 425/587; 366/78; 366/100
[58] Field of Search ..................................... 425/585, 587, 425/542, 145, 592, 593; 366/78, 100

[56] References Cited

U.S. PATENT DOCUMENTS

| | | | |
|---|---|---|---|
| 3,890,308 | 6/1975 | Collins . | |
| 4,879,077 | 11/1989 | Shimizu et al. | 425/145 |
| 5,158,783 | 10/1992 | Inaba et al. | 425/145 |
| 5,348,463 | 9/1994 | Keitel et al. | 425/145 |
| 5,879,597 | 3/1999 | Urbanck | 366/78 |

*Primary Examiner*—Jill L. Heitbrink
*Attorney, Agent, or Firm*—Notaro & Michalos P.C.

[57] ABSTRACT

An injection unit for injection moulding machines comprising a plasticizing cylinder and a plasticizing screw which is arranged rotatably therein and axially displaceably by a crank drive, wherein there is provided a drive motor (1) which selectively either rotates the plasticizing screw (2) or advances same by means of a crank (5) which is pivotably connected to a thrust rod (4), and wherein there is provided a further drive motor (8) which by way of a crank (10) drives a thrust rod (9) arranged in mirror image relationship in plan view in relation to the first thrust rod (4).

3 Claims, 3 Drawing Sheets

INJECTION UNIT FOR INJECTION MOLDING MACHINES

The invention concerns an injection unit for injection moulding machines comprising a plasticising cylinder and a plasticising screw which is arranged rotatably therein and axially displaceably by two oppositely movable cranks.

In a known apparatus of that kind (see EP 0 639 444) a single motor drives two crank drives which are synchronised by a transmission arrangement. A further motor serves to rotate the plasticising screw during the plasticising operation.

The forces which are required to advance the plasticising screw and by which the plastics material is injected into the mould are typically between 100 and 1000 kN. It has surprisingly been found that, with forces of that order of magnitude, the saving of a motor represents only an apparent advantage. The structural and thus economic expenditure is reduced if two motors are provided, which can each apply half of the injection force. The invention is therefore characterised in that each crank is driven by its own drive motor which is in the form of an electric motor. In comparison with the state of the art, such a structure saves a complicated synchronisation transmission arrangement as synchronisation of electric motors can be effected by a simple electrical regulating device.

As the forces required to rotate the plasticising screw during the plasticising operation are substantially less than the forces required for injection of the plastics material, it is also possible in accordance with the invention to achieve success with a total of two motors for the plasticising step and for injection of the plastics material. For that purpose it is provided that one of the drive motors selectively either rotates the plasticising screw or advances same by means of a crank which is pivotably connected to a thrust rod. During the plasticising operation therefore one of the two motors rotates the plasticising screw whereas the other is available to apply the dynamic pressure which is minimal in comparison with the injection pressure.

Figure 2:
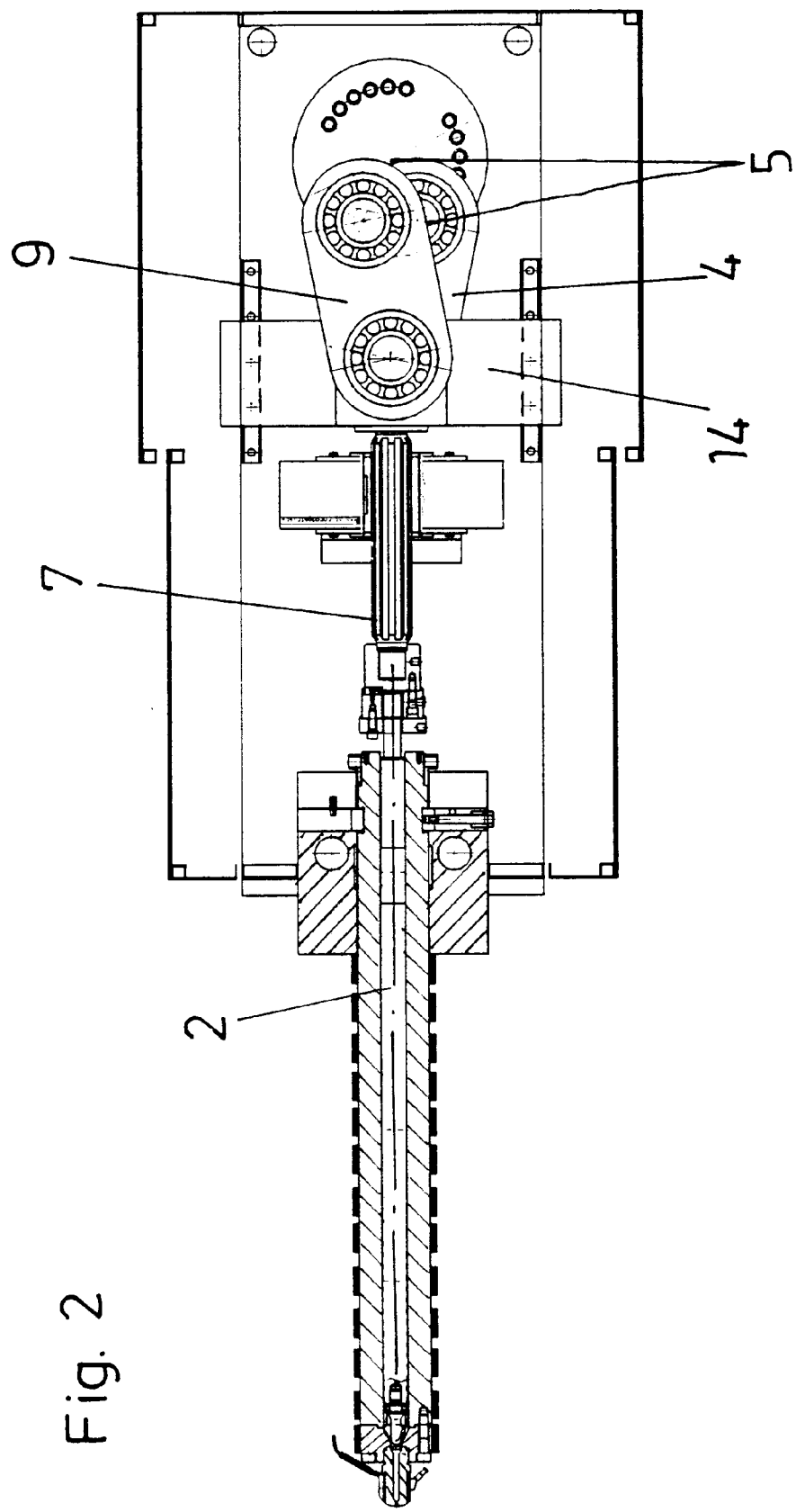
Figure 3:
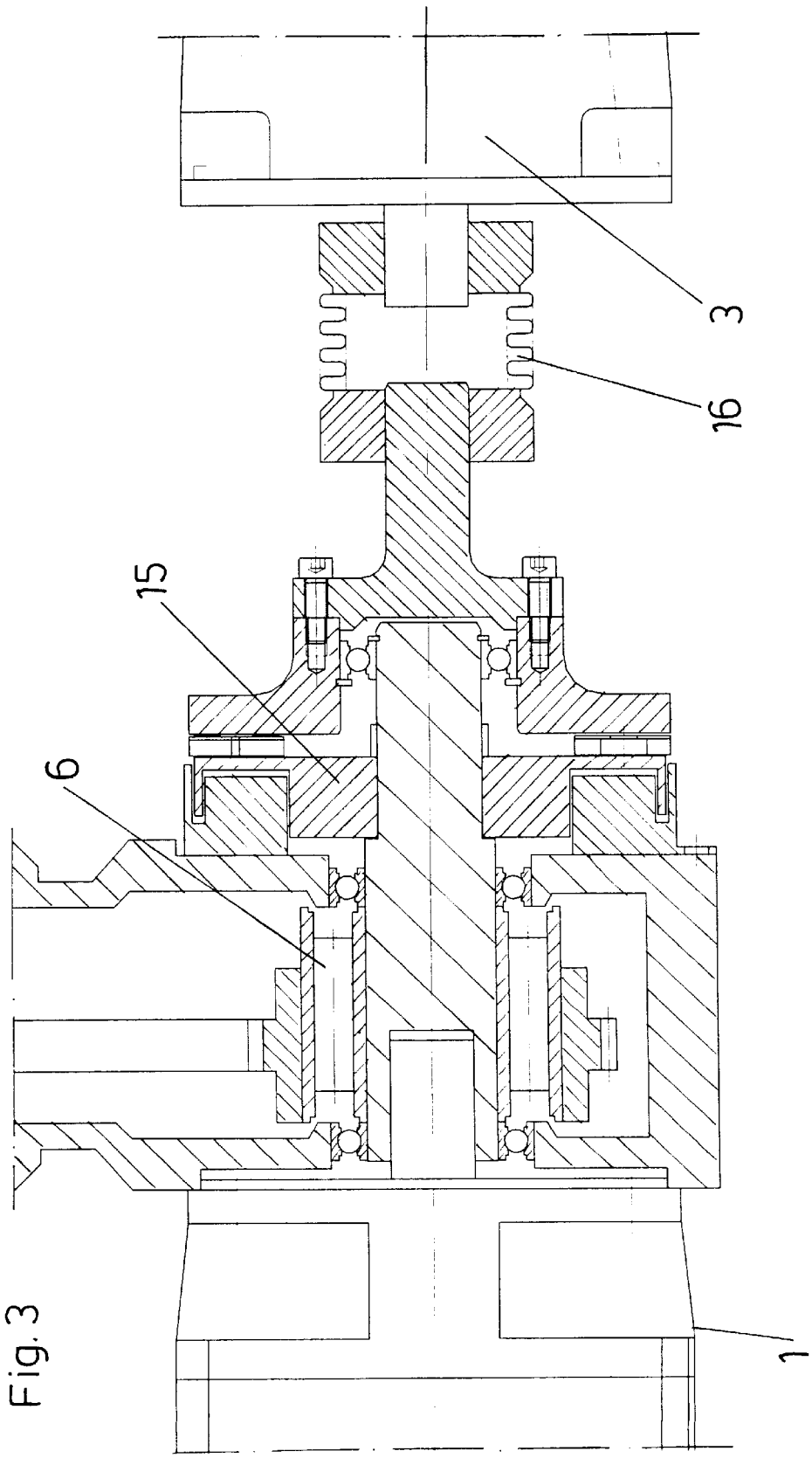

Further details of the invention are described hereinafter with reference to the drawing in which FIG. 1 is a view in section through the vertical longitudinal central plane of the injection unit of an injection moulding machine, FIG. 2 is a plan view onto a section taken along line II—II in FIG. 1 and FIG. 3 is a representation of the line of force from the drive motor 1.

The injection unit shown in FIG. 1 is displaceable by means of a chain drive 11 relative to a main frame structure 12 in a manner which is not shown in detail, in order that it can be moved towards and moved away from an injection moulding mould. Granulated plastics material can be fed by way of a delivery hopper 13 to a plasticising screw 12 which is mounted rotatably and longitudinally slidably in a plasticising cylinder 14.

The drive motor 1 serves to rotate the plasticising screw 2. The drive motor 1 is connected by way of a freewheel clutch 6 to the multi-spline shaft 7 which extends the plasticising screw 2. While the plasticising screw 2 is being rotated it can therefore move towards the right in FIG. 1 relative to the motor 1. During that displacement the dynamic pressure (of the order of magnitude of between 5 and 10 bars) is applied to the plasticising screw 2 by the motor 8 by way of the associated crank 10 by means of the thrust rod 9.

So that the plasticising screw can be pushed into the foremost position shown in FIG. 2 after termination of the plasticising operation by means of the two motors 1 and 8 and by way of the two cranks 5 and 10 and the thrust rods 4 and 9 (see FIG. 2), the drive output of the drive motor 1 is of the configuration as shown in FIG. 3: the connection to the multi-spline shaft 7 is made by way of a freewheel clutch 6. The drive motor 1 is therefore connected to the multi-spline shaft for the transmission of rotary movement in one direction of rotation while it is released therefrom in the other direction of rotation. In contrast the connection of the drive motor 1 to the angle transmission 3 is by way of an electromagnetic clutch 15 which can be engaged and disengaged, and by way of a continuously operative metal facing clutch 16. During the plasticising operation, when therefore the drive motor 1 is in engagement with the multi-spline shaft 7 by way of mutually meshing gears, the clutch 15 is disengaged. During the injection operation the direction of rotation of the drive motor 1 is reversed. That causes the freewheel clutch 6 to become operative so that the plasticising screw no longer rotates. The drive motor 1 is connected by way of the clutch 15 to the transmission 3 and moves the thrust rod 4 forwardly in mirror image relationship to the thrust rod 9.

Instead of the reversible drive motor 1 illustrated it would be possible to use a motor which rotates in the same direction and which is connected either to the multi-spline shaft 7 or the angle transmission 3 selectively by means of two switchable clutches. In this case also it will be possible to use two motors to advance the plasticising screw, at least one of which motors can also be used during the plasticising operation.

As a departure from the illustrated embodiment it is readily possible for the drive motor 1 to be used only to actuate the crank 5 with the thrust rod 4 and for the rotoary movement of the multi-spline shaft 7 to be transferred to a separate third drive motor.

We claim:

1. An injection unit for injection moulding machines comprising a plasticising cylinder and a plasticising screw which is arranged rotatably therein and axially displaceably by two oppositely movable cranks characterised in that each crank (5, 10) is driven by its own drive motor (1, 8) which is in the form of an electric motor.

2. An injection unit according to claim 1 characterised in that one of the drive motors (1) selectively either rotates the plasticising screw (2) or advances same by means of a crank (5) pivotably connected to a thrust rod (4).

3. An injection unit according to claim 2 characterised in that the drive motor (1) is reversible and is coupled to the plasticising screw (2) by way of a freewheel transmission (6) and a multi-spline shaft (7).

* * * * *